United States Patent
Lee et al.

(10) Patent No.: US 9,822,249 B2
(45) Date of Patent: Nov. 21, 2017

(54) ASPHALT MODIFYING AGENT WITH IMPROVED MIXING PERFORMANCE AND ASPHALT COMPOSITION CONTAINING THE SAME

(71) Applicant: LG Chem, Ltd., Seoul (KR)

(72) Inventors: Chun Hwa Lee, Daejeon (KR); Jung Eun Woo, Daejeon (KR); You Seok Seo, Daejeon (KR)

(73) Assignee: LG Chem, Ltd. (KR)

( * ) Notice: Subject to any disclaimer, the term of this patent is extended or adjusted under 35 U.S.C. 154(b) by 122 days.

(21) Appl. No.: 14/408,825

(22) PCT Filed: Jun. 24, 2014

(86) PCT No.: PCT/KR2014/005550
§ 371 (c)(1),
(2) Date: Dec. 17, 2014

(87) PCT Pub. No.: WO2015/002399
PCT Pub. Date: Jan. 8, 2015

(65) Prior Publication Data
US 2016/0024292 A1    Jan. 28, 2016

(30) Foreign Application Priority Data

Jul. 5, 2013  (KR) ........................ 10-2013-0078986
Mar. 4, 2014  (KR) ........................ 10-2014-0025623

(51) Int. Cl.
| | |
|---|---|
| C08L 53/02 | (2006.01) |
| C08L 95/00 | (2006.01) |
| C04B 26/26 | (2006.01) |
| C08F 297/04 | (2006.01) |
| C04B 111/00 | (2006.01) |

(52) U.S. Cl.
CPC .............. *C08L 53/02* (2013.01); *C04B 26/26* (2013.01); *C08F 297/04* (2013.01); *C08L 95/00* (2013.01); *C04B 2111/0075* (2013.01)

(58) Field of Classification Search
CPC ............ C04B 26/26; C04B 2111/0075; C08F 297/04; C08L 53/02; C08L 95/00; C08L 2555/54; C08L 2555/84; C08L 2555/86
See application file for complete search history.

(56) References Cited

U.S. PATENT DOCUMENTS

| | | | |
|---|---|---|---|
| 6,087,420 A | 7/2000 | Planche et al. | |
| 6,376,593 B1 * | 4/2002 | Sasaka | B60C 1/0016 524/424 |
| 6,833,411 B2 | 12/2004 | Fujiwara et al. | |
| 7,417,081 B2 * | 8/2008 | Nakajima | C08L 95/00 524/68 |
| 2005/0004273 A1 | 1/2005 | Chun et al. | |
| 2010/0273915 A1 | 10/2010 | Choen et al. | |
| 2014/0329939 A1 * | 11/2014 | Iliopoulos | C08C 19/20 524/68 |

FOREIGN PATENT DOCUMENTS

| | | | |
|---|---|---|---|
| CN | 1765996 A | 5/2006 | |
| FR | WO 2013092809 A1 * | 6/2013 | ............. C08L 95/00 |
| JP | S56-5853 A | 1/1981 | |
| JP | H10168322 | 6/1998 | |
| JP | H10168323 A | 6/1998 | |
| JP | 2000514133 A | 10/2000 | |
| JP | 2001049081 | 2/2001 | |
| JP | 2003055560 A | 2/2003 | |
| KR | 20010068963 A | 7/2001 | |
| KR | 20030046053 A | 6/2003 | |
| KR | 100711270 B1 | 4/2007 | |
| KR | 20110038244 A | 4/2011 | |
| WO | 9422957 A1 | 10/1994 | |

OTHER PUBLICATIONS

Office Action from Chinese Application No. 201480001603.1, dated Mar. 4, 2016.
International Search eport for Application No. PCT/KR2014005550 dated Oct. 10, 2014.
Anonymous: "Indopol Polybutene Grade H-18000." Sep. 1, 2008, p. 1, XP055344381. Retrieved from the Internet: URL:http://www.ineos.com/show-document/Render?grade=IndopolH-18000&bu=INEOS+-Oligomers&doucmentType=Technical Data Sheet&docLanguage=EN [retrieved on Feb. 10, 2017].
Extended Search Report from European Application No. 14812116.3, dated Feb. 23, 2017.

* cited by examiner

*Primary Examiner* — Christopher M Rodd
(74) *Attorney, Agent, or Firm* — Lerner, David, Littenberg, Krumholz & Mentlik, LLP

(57) ABSTRACT

Disclosed are an asphalt modifying agent and an asphalt composition containing the same. More specifically, disclosed are an asphalt modifying agent comprising a vinyl aromatic hydrocarbon-conjugated diene block copolymer and a low-molecular weight conjugated diene rubber (LCDR), and an asphalt composition containing the same.

Advantageously, the present invention provides an asphalt modifying agent for greatly improving low-temperature properties and modification workability of a modified asphalt and an asphalt composition containing the same.

19 Claims, No Drawings

ASPHALT MODIFYING AGENT WITH IMPROVED MIXING PERFORMANCE AND ASPHALT COMPOSITION CONTAINING THE SAME

CROSS-REFERENCE TO RELATED APPLICATIONS

The present application is a national phase entry under 35 U.S.C. §371 of International Application No. PCT/KR2014/005550 filed Jun. 24, 2014, which claims the benefit of Korean Patent Application No. 10-2013-0078986, filed on Jul. 5, 2013 and Korean Patent Application No. 10-2014-0025623, filed Mar. 4, 2014, the disclosures of which are incorporated herein by reference.

TECHNICAL FIELD

The present invention relates to an asphalt modifying agent and an asphalt composition containing the same. More specifically, the present invention relates to an asphalt modifying agent for greatly improving low-temperature properties and modification workability of a modified asphalt and an asphalt composition containing the same.

BACKGROUND ART

In general, a modified asphalt means an asphalt which exhibits improved impact resistance, elasticity, flexibility, waterproofing property, storage stability and the like by mixing the asphalt with a polymer modifying agent such as a styrene-butadiene block copolymer.

However, disadvantageously, the modified asphalt is volatile under continuous low temperature conditions and thus causes cracking, it has degraded storage stability when the content of modifying agent or the molecular weight of polymer is increased for improvement of physical properties and it has low workability upon modification due to slightly high viscosity.

Accordingly, there is a need for development of an asphalt modifying agent capable of improving low-temperature properties, post-aging low-temperature properties, modification workability and storage stability of the modified asphalt and an asphalt composition containing the same.

DISCLOSURE

Technical Problem

Therefore, the present invention has been made in view of the above problems, and it is one object of the present invention to provide an asphalt modifying agent for greatly improving low-temperature properties and modification workability of a modified asphalt and an asphalt composition containing the same.

In addition, it is another object of the present invention to provide a modified asphalt produced from the asphalt composition.

The objects described above and other objects can be accomplished by the specification mentioned below.

Technical Solution

In accordance with one aspect of the present invention, provided is an asphalt modifying agent comprising a vinyl aromatic hydrocarbon-conjugated diene block copolymer and a low-molecular weight conjugated diene rubber (LCDR), an asphalt composition containing the same and a modified asphalt produced therefrom.

Advantageous Effects

As apparent from the foregoing, the present invention advantageously provides an asphalt modifying agent for greatly improving low-temperature properties, post-aging low-temperature properties and modification workability of a modified asphalt and a modified asphalt composition containing the same.

BEST MODE

Hereinafter, the present invention will be described in detail.

The asphalt modifying agent according to the present invention comprises a vinyl aromatic hydrocarbon-conjugated diene block copolymer and a low-molecular weight conjugated diene rubber (LCDR).

The low-molecular weight conjugated diene rubber (LCDR) according to the present invention refers to a conjugated diene polymer having a low weight average molecular weight of 70,000 g/mol or less.

The asphalt modifying agent may for example comprise 85 to 97% by weight of the vinyl aromatic hydrocarbon-conjugated diene block copolymer and 3 to 15% by weight of the low-molecular weight conjugated diene rubber (LCDR). Within this range, there are effects of greatly improving low-temperature properties, high-temperature properties, post-aging low-temperature properties and storage stability.

In another example, the asphalt modifying agent may for example comprise 88 to 97% by weight of the vinyl aromatic hydrocarbon-conjugated diene block copolymer and 3 to 12% by weight of the low-molecular weight conjugated diene rubber (LCDR). Within this range, there are effects of greatly improving low-temperature properties, post-aging low-temperature properties and modification workability of asphalts.

In another example, the asphalt modifying agent may for example comprise 88 to 95% by weight of the vinyl aromatic hydrocarbon-conjugated diene block copolymer and 5 to 12% by weight of the low-molecular weight conjugated diene rubber (LCDR). Within this range, there are effects of greatly improving low-temperature properties, post-aging low-temperature properties and modification workability of asphalts.

For example, the vinyl aromatic hydrocarbon preferably comprises at least one selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene, more preferably styrene.

For example, the conjugated diene preferably comprises at least one selected from the group consisting of 1,3-butadiene, 2,3-dimethyl-1,3-butadiene, piperylene, 3-butyl-1,3-octadiene, isoprene and 2-phenyl-1,3-butadiene, more preferably, 1,3-butadiene.

The vinyl aromatic hydrocarbon-conjugated diene block copolymer according to the present invention means a block copolymer comprising a vinyl aromatic monomer block and a conjugated diene monomer block.

The vinyl aromatic hydrocarbon-conjugated diene block copolymer for example comprises a vinyl aromatic hydrocarbon-conjugated diene-vinyl aromatic hydrocarbon triblock copolymer, a vinyl aromatic hydrocarbon-conjugated diene diblock copolymer or a mixture thereof.

In another example, the vinyl aromatic hydrocarbon-conjugated diene block copolymer may be a styrene-butadiene block copolymer.

The vinyl aromatic hydrocarbon-conjugated diene block copolymer is preferably coupled with a coupling agent, or is a block copolymer prepared by continuously adding monomers without using a coupling agent.

The coupling agent may for example comprise at least one selected from tetrachlorosilane, trichloromethylsilane, dichlorodimethylsilane and the like. Preferably, the coupling agent may for example comprise at least one selected from tetrachlorosilane and dichlorodimethylsilane.

Efficiency of the coupling may be 40 to 100%, 40 to 98%, or 45 to 98%. Within this range, there is an effect of superior compatibility with asphalt.

The coupling efficiency according to the present invention may be measured by a method commonly used in the art and an area ratio of a coupled moiety and a non-coupled moiety of the vinyl aromatic hydrocarbon-conjugated diene block copolymer is for example measured by a percentage (%) method using gel permeation chromatography (GPC).

Any vinyl aromatic hydrocarbon-conjugated diene block copolymer may be used without particular limitation so long as it is commonly used as an asphalt modifying agent. However, for example, the vinyl aromatic hydrocarbon-conjugated diene block copolymer is prepared by sequentially adding vinyl aromatic hydrocarbon and conjugated diene to a reactor containing a hydrocarbon solvent and an organolithium compound, performing polymerization at a temperature of −5 to 150° C. and at a pressure of 0.1 to 10 bar which correspond to conditions enabling reactants to remain liquid until a consumption ratio of monomers reaches 99% by weight or more, and inactivating active polymers by addition of water or alcohol to terminate polymerization.

In another example, the vinyl aromatic hydrocarbon-conjugated diene block copolymer may be prepared by connecting conjugated diene blocks of the prepared block copolymers by further addition of a coupling agent after polymerization, and inactivating active polymers by addition of water or alcohol to terminate polymerization.

The hydrocarbon solvent may for example comprise at least one selected from the group consisting of n-pentane, n-hexane, n-heptane, isooctane, cyclohexane, toluene, benzene, xylene and naphthalene hydrocarbons and the like, and is preferably n-hexane, cyclohexane or a mixture thereof.

A polar solvent may be added to the hydrocarbon solvent. The polar solvent functions to control the content of vinyl structures and improve polymerization speed upon polymerization of conjugated diene.

The polar solvent may for example comprise at least one selected from the group consisting of tetrahydrofuran, ethyl ether, tetramethylethylenediamine and benzofuran, and is more preferably tetrahydrofuran.

For example, the organolithium compound is preferably an alkyl lithium compound, more preferably, an alkyl lithium compound having a C3-C10 alkyl group.

In a specific example, the alkyl lithium compound is methyl lithium, ethyl lithium, isopropyl lithium, n-butyl lithium, sec-butyl lithium, tert-butyl lithium or the like, more preferably n-butyl lithium or sec-butyl lithium.

The vinyl aromatic hydrocarbon-conjugated diene block copolymer has, for example, a weight average molecular weight of 50,000 to 500,000 g/mol, specifically 50,000 to 350,000 g/mol, more specifically, 80,000 to 350,000 g/mol. Within this range, there is an effect of maintaining balance between high-temperature properties and low-temperature properties in the asphalt modifying agent.

The vinyl aromatic hydrocarbon-conjugated diene block copolymer has for example a conjugated diene content of 50 to 85% by weight, more specifically, 60 to 75% by weight. Within this range, there is an effect of maintaining balance between high-temperature properties and low-temperature properties.

The low-molecular weight conjugated diene rubber (LCDR) is for example a polymer composed of only one or more conjugated diene monomers and is prepared by adding only monomers without using a coupling agent or by coupling using the coupling agent.

The conjugated diene monomer may for example comprise at least one selected from the group consisting of 1,3-butadiene, 2,3-dimethyl-1,3-butadiene, piperylene, 3-butyl-1,3-octadiene, isoprene, 2-phenyl-1,3-butadiene and the like, more preferably 1,3-butadiene.

For example, the low-molecular weight conjugated diene rubber (LCDR) is preferably low-molecular weight polybutadiene (LBR). The low-molecular weight polybutadiene (LBR) is a polymer composed of one or more conjugated diene monomers and is prepared by adding only monomers without a coupling agent or by coupling using the coupling agent.

The low-molecular weight polybutadiene (LBR) may be a polymer in which 1,2-bonds structures and 1,4-bond structures of 1,3-butadiene are in random or block configuration.

The low-molecular weight conjugated diene rubber (LCDR) for example has a weight average molecular weight of 8,000 to 52,000 g/mol, more preferably, 8,500 to 50,000 g/mol. Within this range, there are effects of greatly improving post-aging low-temperature properties and modification workability.

The low-molecular weight polybutadiene (LBR) has for example a vinyl content of 10 to 25% by weight, preferably 10 to 15% by weight. Within this range, there are effects of superior modification and excellent processability.

The asphalt composition according to the present invention comprises an asphalt and the asphalt modifying agent according to the present invention.

The asphalt composition according to the present invention may for example comprise 92 to 97% by weight of the asphalt, 2 to 7% by weight of the vinyl aromatic hydrocarbon-conjugated diene block copolymer, 0.05 to 0.5% by weight of sulfur and 0.1 to 1% by weight of the low-molecular weight conjugated diene rubber (LCDR). In this case, there is an effect of greatly improving modification workability, low-temperature properties, post-aging low-temperature properties, storage stability and the like of the produced modified asphalt.

The reason for this is considered to be that the low-molecular weight conjugated diene rubber (LCDR) rapidly releases interaction between vinyl aromatic hydrocarbon blocks of the vinyl aromatic hydrocarbon-conjugated diene block copolymer to uniformly disperse the vinyl aromatic hydrocarbon-conjugated diene block copolymer in the asphalt, the content of conjugated diene closely related to elasticity of the modifying agent is generally increased, the low-molecular weight conjugated diene rubber (LCDR) is first cross-linked by sulfur, and a decomposition speed of the main chain of the vinyl aromatic hydrocarbon-conjugated diene block copolymer after dissolution of the block copolymer is inhibited.

The asphalt is not particularly limited, but is for example a petroleum asphalt.

The sulfur is for example present in an amount of 0.1 to 0.3% by weight, 0.10 to 0.25% by weight, 0.1 to 0.2% by weight, or 0.1 to 0.15% by weight. Within this range, an effect of improving post-aging low-temperature properties is excellent.

When a small amount of sulfur is added, the effects of improving post-aging low-temperature properties and storage stability cannot be obtained, and when a great amount of sulfur is added, it is difficult to control dissolution degree in the preparation of modified asphalt due to high cross-linking speed, so that gelation is easily generated, sufficient degassing is impossible, so that bubbles present in the sample cause defects, thus causing deterioration in physical properties. In addition, disadvantageously, workability is rapidly deteriorated due to high viscosity of 3,000 cPs or higher.

A weight ratio of the vinyl aromatic hydrocarbon-conjugated diene block copolymer to the low-molecular weight conjugated diene rubber (LCDR) is for example 85:15 to 97:3, or 88:12 to 95:5. Within this range, there are effects of greatly improving modification workability and low-temperature properties of produced modified asphalt.

The modified asphalt according to the present invention is produced from the asphalt composition.

The modified asphalt for example has an elongation (5° C.) of 18 to 30 cm or 20 to 28 cm.

The modified asphalt for example has a viscosity (135° C.) of 1,500 to 4,000 cPs, or 1,800 to 3,000 cPs.

The modified asphalt for example has a softening point of 75 to 95° C. or 80 to 95° C.

Improvement degree of the low-temperature properties is for example evaluated, based on whether or not an elongation (5° C.) varies, variation degree of the elongation (5° C.) or an elongation after aging in an RTFO (rolling thin film oven) which is an apparatus for measuring aging. As elongation (5° C.) increases, low-temperature properties are improved.

The elongation (5° C.) according to the present invention is defined as a length of a specimen which increases until the specimen breaks when pulled in opposite directions in a constant-temperature bath maintained at 5° C. The elongation after aging in the RTFO is defined as a value measured in the same manner as in ASTM D113 which is a method of measuring an elongation (5° C.) before aging of the sample aged by applying hot air for a predetermined time at 163° C.

The modified asphalt is for example a modified asphalt for road pavement.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLE

<Preparation of Styrene-butadiene Block Copolymer>

3,300 g of purified cyclohexane and 322 g of styrene were charged into a 10 L reactor purged with nitrogen and the temperature was elevated to 60° C. while stirring. 1.1 g of n-butyl lithium was added to the mixture solution of cyclohexane and styrene at 60° C., a styrene block was polymerized, and 717 g of butadiene and 1.2 g of dichlorodimethylsilane were sequentially added thereto. After completion of the reaction, 0.2 g of water was added to the reactor to perform a termination reaction of removing activity of active polymers and thereby prepare a styrene-butadiene block copolymer solution having a weight average molecular weight of 103,000 g/mol and a styrene block content of 31% by weight.

<Preparation of Crumb by Collection of Polymer from Polymer Solution>

Stripping is generally performed so as to collect only the polymer from the polymer solution. That is, 2.5 g of tamol and 0.5 g of $CaCl_2$ as a dispersant were added to 3 L of water. Then, when the polymer solution was slowly added dropwise to boiling water, the solvent in the solution was evaporated and the polymer was aggregated in water and was then dispersed to a size of 1 to 20 nm in water. The resulting polymer was recovered and dried in a 60° C. oven for 16 hours to prepare a crumb-type polymer.

Example 1

<Preparation of Low-molecular Weight Polybutadiene (LBR)>

4,800 g of purified cyclohexane and 0.69 g of n-butyl lithium were charged into a 10 L reactor purged with nitrogen and the temperature was elevated to 50° C. while stirring. 540 g of butadiene was added to the mixture solution of cyclohexane and n-butyl lithium at 50° C., and polybutadiene was polymerized. After completion of the reaction, 0.2 g of water was added to the reactor to perform a termination reaction of removing activity of active polymers and thereby prepare a low-molecular weight polybutadiene (LBR) solution having a weight average molecular weight of 48,000 g/mol.

<Preparation of Asphalt Modifying Agent>

The styrene-butadiene block copolymer solution prepared in <Preparation of styrene-butadiene block copolymer> and the low-molecular weight polybutadiene (LBR) solution prepared in the <Preparation of low-molecular weight polybutadiene (LBR)> were mixed in a weight ratio of the styrene-butadiene block copolymer to low-molecular weight polybutadiene (SBS:LBR) of 9:1 in consideration of respective solution concentrations to prepare a polymer mixture solution, and a polymer mixture crumb was then produced in the same manner as in <Production of crumb by collection of polymer from polymer solution>.

<Production of Asphalt Composition and Modified Asphalt>

500 g of an asphalt (AP-5 having physical properties shown in the following Table 1, available from SK Innovation Co., Ltd.) was added to a mix container, 23.37 g of the polymer mixture crumb was added thereto while maintaining a mixing temperature at 160° C. and a stirring speed at 2,000 rpm, followed by stirring at an elevated temperature of 180° C. and an increased stirring speed of 2,500 rpm for 50 minutes. 0.524 g of sulfur was added to the mixture solution, followed by stirring for 10 minutes and then stirring the mixture at a decreased stirring speed of 300 rpm for 60 minutes to produce a modified asphalt. Sampling was performed to measure physical properties of the dissolved modified asphalt. The asphalt used herein was 1 of AP-5 shown in the following Table 1.

TABLE 1

| AP-5 | Penetration index (dmm) | Softening point (° C.) | Viscosity (cPs) | | |
|---|---|---|---|---|---|
| | | | 100° C. | 120° C. | 135° C. |
| 1 | 67 | 46.1 | 3,600 | 970 | 430 |
| 2 | 60 | 46~47 | 3,700 | 1,000 | 445 |

In Table 1, penetration index was measured at 25° C. in accordance with ASTM D946, softening point was measured in accordance with ASTM D36, and viscosity was measured using a #27 spindle in accordance with ASTM D4402 using a Brookfield DV-II+Pro Model.

Example 2

A low-molecular weight polybutadiene (LBR) having a weight average molecular weight of 32,000 g/mol was prepared in the same manner as in Example 1, except that 1.15 g of n-butyl lithium was added in <Preparation of low-molecular weight polybutadiene (LBR)>, a mixture of the styrene-butadiene block copolymer and the low-molecular weight polybutadiene was prepared in the same weight ratio as in Example 1, and an asphalt modifying agent and a modified asphalt were then produced in the same manner as in Example 1. Sampling was performed to measure physical properties of the dissolved modified asphalt.

Example 3

A low-molecular weight polybutadiene (LBR) having a weight average molecular weight of 8,700 g/mol was prepared in the same manner as in Example 1, except that 3.24 g of n-butyl lithium was added in <Preparation of low-molecular weight polybutadiene (LBR)>, a mixture of the styrene-butadiene block copolymer and the low-molecular weight polybutadiene was prepared in the same weight ratio as in Example 1, and an asphalt modifying agent and a modified asphalt were produced in the same manner as in Example 1. Sampling was performed to measure physical properties of the dissolved modified asphalt.

Comparative Example 1

An asphalt modifying agent was prepared in the same manner as in Example 1, except that an asphalt modifying agent was produced using only the styrene-butadiene block copolymer of <Preparation of styrene-butadiene block copolymer> without using the low-molecular weight polybutadiene (LBR) in Example 1 (accordingly, styrene-butadiene block copolymer crumb was used instead of the polymer mixture crumb in <Preparation of asphalt modifying agent> of Example 1 and the total amount of the styrene-butadiene block copolymer and the low-molecular weight polybutadiene (LBR) mixture crumb of Example 1 was equal to the total amount of the styrene-butadiene block copolymer crumb of Comparative Example 1). Sampling was performed to measure physical properties of the dissolved modified asphalt.

Comparative Example 2

A low-molecular weight polybutadiene (LBR) having a weight average molecular weight of 55,000 g/mol was prepared in the same manner as in Example 1, except that 0.63 g of n-butyl lithium was added in <Preparation of low-molecular weight polybutadiene (LBR)> of Example 1, a mixture of the styrene-butadiene block copolymer and the low-molecular weight polybutadiene was prepared in the same weight ratio as in Example 1, and an asphalt modifying agent and a modified asphalt were then produced in the same manner as in Example 1. Sampling was performed to measure physical properties of the dissolved modified asphalt.

Comparative Example 3

A low-molecular weight polybutadiene (LBR) having a weight average molecular weight of 7,200 g/mol was prepared in the same manner as in Example 1, except that 4.78 g of n-butyl lithium was added in <Preparation of low-molecular weight polybutadiene (LBR)> of Example 1, and a mixture of the styrene-butadiene block copolymer and the low-molecular weight polybutadiene was prepared in the same weight ratio as in Example 1, and an asphalt modifying agent and a modified asphalt were produced in the same manner as in Example 1. Sampling was performed to measure physical properties of the dissolved modified asphalt.

Example 4

An asphalt modifying agent and a modified asphalt were produced in the same manner as in Example 2, except that 0.786 g of sulfur was used and stirring was performed for 45 minutes at a decreased stirring speed of 300 rpm after addition of sulfur in Example 2. Sampling was performed to measure physical properties of the dissolved modified asphalt.

Comparative Example 4

An asphalt modifying agent was prepared in the same manner as in Example 4, except that an asphalt modifying agent was produced using only the styrene-butadiene block copolymer of <Preparation of styrene-butadiene block copolymer> without using the low-molecular weight polybutadiene (LBR) in Example 4 (accordingly, styrene-butadiene block copolymer crumb was used instead of the polymer mixture crumb in <Preparation of asphalt modifying agent> of Example 4 and the total amount of the styrene-butadiene block copolymer and the low-molecular weight polybutadiene (LBR) mixture crumb of Example 4 was equal to the total amount of the styrene-butadiene block copolymer crumb of Comparative Example 4). Sampling was performed to measure physical properties of the dissolved modified asphalt.

Example 5

An asphalt modifying agent and a modified asphalt were produced in the same manner as in Example 2, except that 1.31 g of sulfur was used and stirring was performed for 30 minutes at a decreased stirring speed of 300 rpm after addition of sulfur in Example 2. Sampling was performed to measure physical properties of the dissolved modified asphalt.

Comparative Example 5

An asphalt modifying agent was prepared in the same manner as in Example 5, except that an asphalt modifying agent was produced using only the styrene-butadiene block copolymer of <Preparation of styrene-butadiene block copolymer> without using the low-molecular weight polybutadiene (LBR) in Example 5 (accordingly, styrene-butadiene block copolymer crumb was used instead of the polymer mixture crumb in <Preparation of asphalt modifying agent> of Example 5 and the total amount of the styrene-butadiene block copolymer and the low-molecular weight polybutadiene (LBR) mixture crumb of Example 5 was equal to the total amount of the styrene-butadiene block copolymer crumb of Comparative Example 5). Sampling was performed to measure physical properties of the dissolved modified asphalt.

Example 6

An asphalt modifying agent and a modified asphalt were produced in the same manner as in Example 2, except that the asphalt modifying agent and the modified asphalt were produced using 2 of AP5 shown in Table 1. Sampling was performed to measure physical properties of the dissolved modified asphalt.

Example 7

An asphalt modifying agent and a modified asphalt were produced in the same manner as in Example 6, except that a mixture of the styrene-butadiene block copolymer (SBS) and the low-molecular weight polybutadiene (LBR) was prepared in a weight ratio of SBS:LBR=95:5 in Example 6. Sampling was performed to measure physical properties of the dissolved modified asphalt.

Comparative Example 6

An asphalt modifying agent was prepared in the same manner as in Example 6, except that an asphalt modifying agent was produced using only the styrene-butadiene block copolymer of <Preparation of styrene-butadiene block copolymer> without using the low-molecular weight polybutadiene (LBR) in Example 6 (accordingly, styrene-butadiene block copolymer crumb was used instead of the polymer mixture crumb in <Preparation of asphalt modifying agent> of Example 6 and the total amount of the styrene-butadiene block copolymer and the low-molecular weight polybutadiene (LBR) mixture crumb of Example 6 was equal to the total amount of the styrene-butadiene block copolymer crumb of Comparative Example 6). Sampling was performed to measure physical properties of the dissolved modified asphalt.

Example 8

An asphalt modifying agent and a modified asphalt were produced in the same manner as in Example 4, except that the asphalt modifying agent and the modified asphalt were produced using 2 of AP5 shown in Table 1. Sampling was performed to measure physical properties of the dissolved modified asphalt.

Example 9

An asphalt modifying agent and a modified asphalt were produced in the same manner as in Example 8, except that a mixture of the styrene-butadiene block copolymer (SBS) and the low-molecular weight polybutadiene (LBR) was prepared in a weight ratio of SBS:LBR=95:5 in Example 8. Sampling was performed to measure physical properties of the dissolved modified asphalt.

Comparative Example 7

An asphalt modifying agent was prepared in the same manner as in Example 8, except that an asphalt modifying agent was produced using only the styrene-butadiene block copolymer of <Preparation of styrene-butadiene block copolymer> without using the low-molecular weight polybutadiene (LBR) in Example 8 (accordingly, styrene-butadiene block copolymer crumb was used instead of the polymer mixture crumb in <Preparation of asphalt modifying agent> of Example 8 and the total amount of the styrene-butadiene block copolymer and the low-molecular weight polybutadiene (LBR) mixture crumb of Example 8 was equal to the total amount of the styrene-butadiene block copolymer crumb of Comparative Example 7). Sampling was performed to measure physical properties of the dissolved modified asphalt.

Example 10

An asphalt modifying agent and a modified asphalt were produced in the same manner as in Example 8, except that a mixture of the styrene-butadiene block copolymer (SBS) and the low-molecular weight polybutadiene (LBR) was prepared in a weight ratio of SBS:LBR=98:2. Sampling was performed to measure physical properties of the dissolved modified asphalt.

Example 11

An asphalt modifying agent and a modified asphalt were produced in the same manner as in Example 8, except that a mixture of the styrene-butadiene block copolymer (SBS) and the low-molecular weight polybutadiene (LBR) was prepared in a weight ratio of SBS:LBR=83:17. Sampling was performed to measure physical properties of the dissolved modified asphalt.

Test Example

Properties of modified asphalts produced in Examples 1 to 11 and Comparative Examples 1 to 7 were measured in accordance with the following method and results are shown in Table 2.

Weight average molecular weight: respective samples were dissolved in tetrahydrofuran (THF) for 30 minutes, were flowed by loading on a GPC device (gel permeation chromatography, production company: Waters Corp.) and molecular weights of the samples were measured by comparison with the molecular weight of a polystyrene (PS) standard.

Softening point: measured in accordance with ASTM D36.

Viscosity (135° C.): measured in accordance with ASTM D4402 under the condition of a 27# spindle using Brookfield DV-II+Pro Model Elongation (5° C.): measured in accordance with ASTM D113 after the sample was allowed to stand at 5° C. for one hour.

Storage stability: 50 g of modified asphalt composition was weighed in an aluminum tube, allowed to stand in a 163° C. oven for 48 hours, allowed to stand in a −5° C. cooler for 4 hours or more, the composition was divided into three parts, softening points of an upper part and a lower part were measured and the difference in temperature was calculated. As the difference in temperature decreases, storage stability improves. Sampling was performed in accordance with American Association of State Highway and Transportation Officials (AASHTO) PP5 and the softening point was measured in accordance with ASTM D36. Phase separation was considered to be not generated when the difference in temperature was 2° C. or less, and storage stability improves as the difference in temperature decreases.

Rolling thin film oven (RTFO): a modified asphalt sample was aged in accordance with ASTM D2872 at 163° C. and an elongation (5° C.) was measured in accordance with ASTM D113.

TABLE 2

| Items | AP-5 | Elongation (5° C.) (mm) | Elongation after RTFO aging (5° C.) (mm) | Viscosity (135° C.) (cPs) | Softening point (° C.) | Storage stability (° C.) |
|---|---|---|---|---|---|---|
| Example 1 | 1 | 144 | 86 | 1765 | 84.2 | 1.6 |
| Example 2 | 1 | 203 | 95 | 1725 | 83.5 | 0.2 |
| Example 3 | 1 | 225 | 10 | 1595 | 77.6 | 0.8 |
| Comparative Example 1 | 1 | 206 | 10 | 1900 | 86.5 | 11.0 |
| Comparative Example 2 | 1 | 104 | 65 | 1800 | 85.0 | 2.8 |
| Comparative Example 3 | 1 | 220 | 10 | 1590 | 77.0 | 0.5 |
| Example 4 | 1 | 226 | 98 | 1915 | 85.5 | 0.7 |
| Comparative Example 4 | 1 | 208 | 10 | 2185 | 88.5 | 1.7 |
| Example 5 | 1 | 241 | 113 | 2880 | 89.4 | 0.0 |
| Comparative Example 5 | 1 | 211 | 140 | 3070 | 93.6 | Gel (measurement is impossible) |
| Example 6 | 2 | 245 | 109 | 1655 | 83.6 | 5.3 |
| Example 7 | 2 | 189 | 107 | 1740 | 84.0 | 15.4 |
| Comparative Example 6 | 2 | 220 | 102 | 1900 | 85.3 | 16.5 |
| Example 8 | 2 | 284 | 124 | 1915 | 84.8 | 0.7 |
| Example 9 | 2 | 254 | 146 | 2040 | 86.6 | 0.3 |
| Comparative Example 7 | 2 | 266 | 10 | 2185 | 87.7 | 1.7 |
| Example 10 | 2 | 235 | 70 | 2130 | 87.2 | 1.0 |
| Example 11 | 2 | 295 | 10 | 1770 | 83.4 | 0.1 |

As can be seen from Table 2 above, the modified asphalts according to the present invention (Examples 1 to 11) comprise a certain molecular weight or content of low-molecular weight polybutadiene (LBR). Examples 1 to 3 correspond to Comparative Examples 1 to 3, Example 4 corresponds to Comparative Example 4, Example 5 corresponds to Comparative Example 5, Examples 6 to 7 correspond to Comparative Example 6, and Examples 8 to 11 correspond to Comparative Example 7.

In a specific example, modified asphalts (Examples 1, 2 and 3) comprising low-molecular weight polybutadiene (LBR) according to the present invention exhibited greatly improved low-temperature properties (in the case of Examples 1 and 2, elongation after RTFO aging was increased by 7 to 8 cm, and in the case of Example 3, elongation was increased by 2 cm) and greatly improved storage stability (in all of Examples 1, 2 and 3, below 2° C.), as compared to the modified asphalt (Comparative Example 1) comprising no low-molecular weight polybutadiene (LBR). In the case of Comparative Examples 2 to 3 of modified asphalts comprising lower molecular weight or higher molecular weight of polybutadiene, the time that an elongation was greatly decreased by 3 cm or more, or the elongation was decreased again was present, which means that balance in physical properties was deteriorated.

Low-molecular weight polybutadiene with a weight average molecular weight of 32,000 g/mol having excellent balance between high-temperature and low-temperature properties of low-molecular weight polybutadiene (LBR) according to the present invention was selected and physical properties according to sulfur content of modified asphalts produced from an asphalt modifying agent containing the same were evaluated. As a result, modified asphalts (Examples 2, 4 and 5) comprising low-molecular weight polybutadiene (LBR) exhibited superior workability due to low viscosity (135° C.), a similar or 2 to 3 cm higher elongation (5° C.), and storage stability of below 2° C. and thus superior solubility, as compared to modified asphalts (Comparative Examples 1, 4 and 5) comprising no low-molecular weight polybutadiene (LBR). In addition, when 0.1% to 0.15% by weight of sulfur was present, elongation (5° C.) after RTFO aging of the modified asphalt comprising low-molecular weight polybutadiene was increased by 8 cm above that of the modified asphalt comprising no low-molecular weight polybutadiene (Examples 2 and 4, and Comparative Examples 1 and 4).

When comparing physical properties of modified asphalt of the present invention according to sulfur content, modified asphalts comprising low-molecular weight polybutadiene (LBR) produced using 0.15% by weight of sulfur had the most superior balance between physical properties in consideration of high-temperature and low-temperature properties, workability and solubility. Under these conditions, physical properties of modified asphalts according to content of low-molecular weight polybutadiene were evaluated. When 0.1% by weight of sulfur was used (Examples 6 to 7, and Comparative Example 6), the modified asphalt (Example 6) comprising 90% by weight of a styrene-butadiene block copolymer and 10% by weight of low-molecular weight polybutadiene exhibited improved low-temperature properties of 2.5 cm and storage stability of 11° C. while maintaining high-temperature properties and thus had the most superior balance between physical properties. In addition, in the case in which 0.15% by weight of sulfur was used (Examples 8 to 9 and Comparative Example 7), modified asphalts (Examples 8 to 9) comprising 95% by weight of the styrene-butadiene block copolymer and 5 to 10% by weight of the low-molecular weight polybutadiene (LBR) exhibited superior post-aging low-temperature properties (elongation after RTFO aging) and excellent storage stability while maintaining high-temperature properties.

In addition, from data of physical properties shown in Table 2, low-temperature properties of the modified asphalt are closely related to fine molecular structure, content and the like of low-molecular weight polybutadiene (LBR). This means that, upon chemical bonding with the asphalt as a solvent, butadiene in the modified asphalt participates in reaction and sulfur content and butadiene content are thus interdependent.

What is claimed is:
1. An asphalt modifying agent consisting of:
a vinyl aromatic hydrocarbon-conjugated diene block copolymer; and
a low-molecular weight conjugated diene rubber (LCDR), wherein the low-molecular weight conjugated diene rubber (LCDR) consists of a polymer consisting of one or more conjugated diene monomers, and has a weight average molecular weight of 8,000 to 52,000 g/mol.
2. The asphalt modifying agent according to claim 1, wherein the asphalt modifying agent consists of 85 to 97% by weight of the vinyl aromatic hydrocabon-conjugated diene block copolymer and 3 to 15% by weight of the low-molecular weight conjugated diene rubber (LCDR).

3. The asphalt modifying agent according to claim 1, wherein the vinyl aromatic hydrocarbon-conjugated diene block copolymer has a weight average molecular weight of 50,000 to 500,000 g/mol.

4. The asphalt modifying agent according to claim 1, wherein the vinyl aromatic hydrocarbon-conjugated diene block copolymer consists of a vinyl aromatic hydrocarbon-conjugated diene-vinyl aromatic hydrocarbon triblock copolymer, a vinyl aromatic hydrocarbon-conjugated diene diblock copolymer or a mixture thereof.

5. The asphalt modifying agent according to claim 1, wherein the vinyl aromatic hydrocarbon-conjugated diene block copolymer has a conjugated diene content of 50 to 85% by weight.

6. An asphalt composition consisting of:
the asphalt modifying agent according to claim 1; and
an asphalt.

7. The asphalt modifying agent according to claim 1, wherein the low-molecular weight conjugated diene rubber (LCDR) consists of a low-molecular weight polybutadiene (LBR).

8. The asphalt modifying agent according to claim 7, wherein the LBR is a polymer in which 1,2-bond structures and 1,4-bond structures of 1,3-butadiene are in random configuration.

9. An asphalt composition comprising:
92 to 97% by weight of an asphalt;
2 to 7% by weight of a vinyl aromatic hydrocarbon-conjugated diene block copolymer;
0.05 to 0.5% by weight of sulfur; and
0.1 to 1% by weight of a low-molecular weight conjugated diene rubber (LCDR), wherein the low-molecular weight conjugated diene rubber (LCDR) consists of a polymer consisting of one or more conjugated diene monomers, and has a weight average molecular weight of 8,000 to 52,000 g/mol.

10. The asphalt composition according to claim 9, wherein the vinyl aromatic hydrocarbon-conjugated diene block copolymer has a weight average molecular weight of 50,000 to 500,000 g/mol and has a conjugated diene content of 50 to 85% by weight and the low-molecular weight conjugated diene rubber (LCDR) are present in a weight ratio of 88:12 to 95:5.

11. The asphalt composition according to claim 9, wherein the sulfur is present in an amount of 0.1 to 0.3% by weight.

12. A modified asphalt produced from the asphalt composition according to claim 9.

13. A modified asphalt produced from the asphalt composition according to claim 10.

14. The asphalt composition of claim 9, wherein the low-molecular weight conjugated diene rubber (LCDR) has a vinyl content of 10 to 25% by weight.

15. The asphalt modifying agent according to claim 1, wherein the low-molecular weight conjugated diene rubber (LCDR) has an weight average molecular weight of about 32,000 g/mol.

16. The asphalt modifying agent according to claim 1, wherein the low-molecular weight conjugated diene rubber (LCDR) has a vinyl content of 10 to 25% by weight.

17. A modified asphalt produced from the asphalt composition according to claim 11.

18. An asphalt composition comprising:
92 to 97% by weight of an asphalt;
2 to 7% by weight of a vinyl aromatic hydrocarbon-conjugated diene block copolymer;
0.05 to 0.5% by weight of sulfur; and
0.1 to 1% by weight of a low-molecular weight conjugated diene rubber (LCDR), wherein the low-molecular weight conjugated diene rubber (LCDR) is a polymer consisting of one or more conjugated diene monomers, and has a weight average molecular weight of 8,000 to 52,000 g/mol, the asphalt composition having an elongation after rolling thin film oven aging of 86 to 146 mm.

19. The asphalt composition of claim 18, wherein the asphalt composition has a storage stability of 0.2° C. to 1.6° C.

* * * * *